(12) United States Patent
Papineau et al.

(10) Patent No.: US 11,694,464 B2
(45) Date of Patent: Jul. 4, 2023

(54) VEHICLE OCCUPANCY VERIFICATION UTILIZING OCCUPANCY CONFIRMATION

(71) Applicant: RideFlag Technologies Inc., Mississauga (CA)

(72) Inventors: Michel Papineau, Osprey, FL (US); Mark Feltham, Ontario (CA)

(73) Assignee: RideFlag Technologies Inc., Mississauga (CA)

( * ) Notice: Subject to any disclaimer, the term of this patent is extended or adjusted under 35 U.S.C. 154(b) by 0 days.

(21) Appl. No.: 17/316,175

(22) Filed: May 10, 2021

(65) Prior Publication Data

US 2021/0286984 A1    Sep. 16, 2021

Related U.S. Application Data

(63) Continuation-in-part of application No. 16/266,288, filed on Feb. 4, 2019, now Pat. No. 11,003,930.

(51) Int. Cl.
| | |
|---|---|
| *H04W 24/00* | (2009.01) |
| *G06V 40/10* | (2022.01) |
| *G08G 1/01* | (2006.01) |
| *G06Q 50/26* | (2012.01) |
| *G06V 20/20* | (2022.01) |
| *G06V 20/54* | (2022.01) |

(52) U.S. Cl.
CPC ............ *G06V 40/10* (2022.01); *G06Q 50/26* (2013.01); *G06V 20/20* (2022.01); *G06V 20/54* (2022.01); *G08G 1/0116* (2013.01)

(58) Field of Classification Search
CPC ........ G06V 40/10; G06V 20/20; G06Q 50/26; G08G 1/0116
See application file for complete search history.

(56) References Cited

U.S. PATENT DOCUMENTS

| | | | |
|---|---|---|---|
| 2011/0137773 A1* | 6/2011 | Davis, III | G01G 19/4142 340/5.82 |
| 2015/0294144 A1* | 10/2015 | Konishi | G06V 40/166 382/103 |

* cited by examiner

*Primary Examiner* — Justin Y Lee
(74) *Attorney, Agent, or Firm* — Rothwell, Figg, Ernst & Manbeck, P.C.

(57) ABSTRACT

The present invention is a method and system to verify carpool occupancy compliance for access to High Occupancy Vehicle (HOV) lanes, High Occupancy or Toll (HOT) lanes, or other vehicle-occupancy contingent rewards. The present invention uses software and hardware devices with radio-frequency transmitter modules to capture one or more photo images of vehicle occupants and to perform boxed headcounts of humans in any given photo frame. The present invention uses biometric signature detection to confirm the boxed headcounts and a realness algorithm to further confirm the genuineness of any human image. Occupancy compliance can be communicated directly to an appropriate regulatory body.

22 Claims, 7 Drawing Sheets

VEHICLE OCCUPANCY VERIFICATION UTILIZING OCCUPANCY CONFIRMATION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

CLAIM TO PRIORITY

This application claims under 35 U.S.C. § 120, the benefit of the application Ser. No. 16/266,288, filed Feb. 4, 2019, and titled "Vehicle Occupancy Verification Utilizing Proximity Confirmation" which is hereby incorporated by reference in its entirety.

BACKGROUND

More and more Department of Transportation (DOT) jurisdictions seek to create incentives for carpooling such as access to High Occupancy Vehicle (HOV) lanes on public highways. Such HOV lanes permit use only when a vehicle is being used to transport multiple occupants. One of the challenges with dedicating a lane to such "carpooling", particularly in the introductory phase when there are not many carpoolers, is the resulting, and politically unpopular, increased congestion in the remaining, regular lanes.

To help mitigate this issue, many jurisdictions are introducing HOV lanes as High occupancy/OR Toll (HOT) lanes (also known as Express Lanes) to provide paid access to the lanes for single-occupant vehicles. While paid access to HOT lanes can be less democratic than access to lanes based solely upon occupancy, use of HOT lanes can be more politically acceptable. This is because overall traffic congestion resolution theoretically becomes self-regulating: some drivers will opt to pay a toll to access a reserved lane when congestion is high.

An additional carpooling incentive can take the form of access to private toll roads, with such access also being based upon paid admission. While carpooling can erode the profitability of toll highways, the availability of carpooling on private toll roads can help to alleviate overall traffic volume while simultaneously leading to lower road maintenance and lane expansion costs.

One of the biggest challenges in a municipality's introduction of a carpool lane is its being able to enforce a carpool occupancy requirement and, in the case of HOT lane access, although the system may know the identity of the party to be billed for HOT lane occupancy access, the validation of occupants in a vehicle with any accuracy is currently dependent upon an honor system where users self-declare their occupancy count and the validation count is accepted on that basis. Additionally, while technology exists to capture a photo from an exterior camera as a vehicle passes by the exterior camera and use this photo as confirmation to determine occupancy, these technologies often produce questionable confirmations that subsequently require human operator intervention post lane-access. Periodically, such technologies lead to incorrect billing, resulting in a costly and time-consuming review process.

Alternatively, drivers may employ transponder-based systems that require driver input prior to beginning a shared ride. Before approaching a verification point, a driver using a transponder system must remember to indicate carpool activity, usually by activating a switch on his transponder. In some cases, the driver may shield his transponder so that an LPR system can read the license plate so that the LPR system may intervene before billing takes place. In this case, the license plate number and sometimes carpool sticker on the back of the car are photographed by a camera operated by the LPR system. The photographs may be verified against a prequalified carpool user list and if a match is found an exception is made. This reliance on driver action to trigger an exception can lead to system failure in cases where a driver fails to timely or properly indicate carpool activity.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
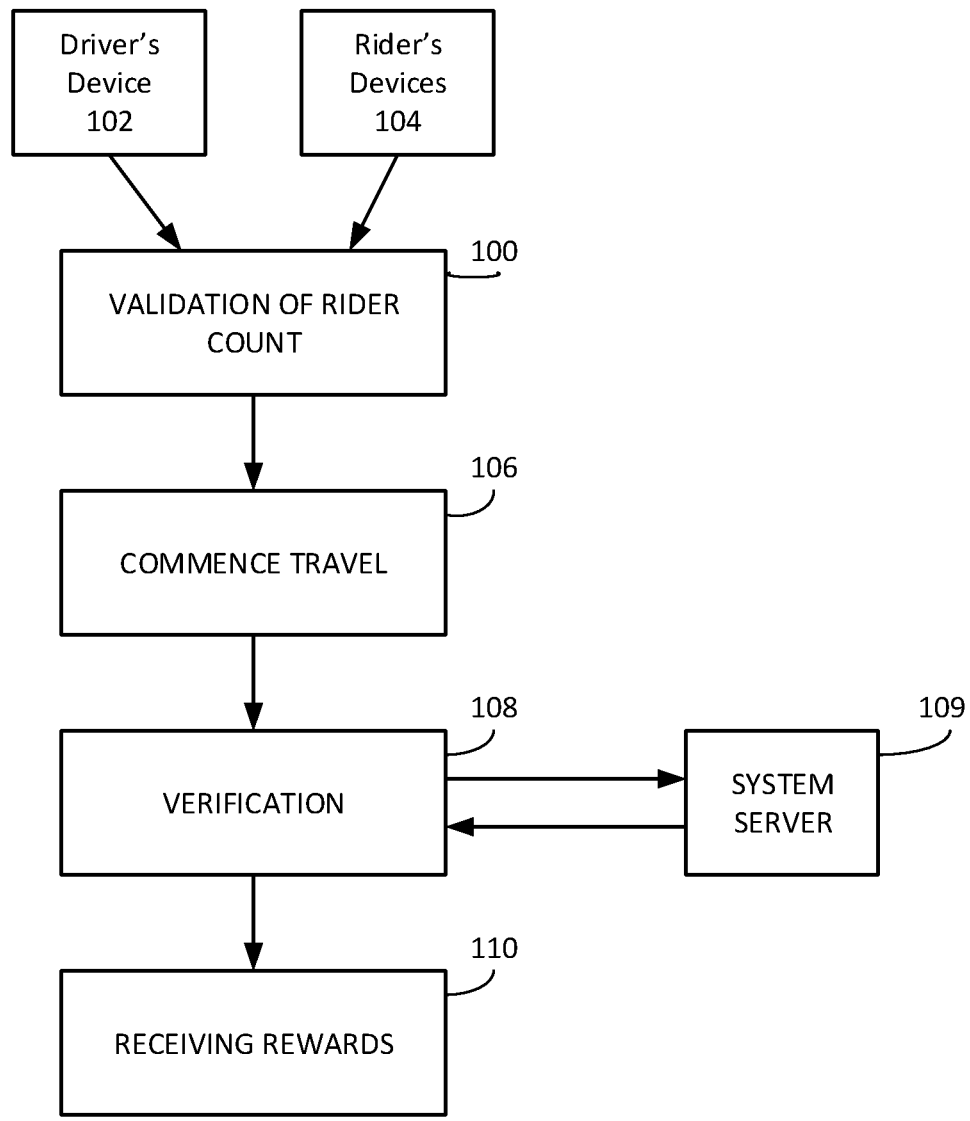
FIG. 1 is a system diagram for an exemplary system operation consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

References herein to "device" indicate electronic devices that include but are not limited to, a radio frequency (RF) transmitter, a mobile phone, a laptop, an electronic tablet, or any personal digital assistance device.

References to "verification" indicate an objective process for confirming user input to a device.

References to "validation point" indicate any physical location where a request for verification could logically be made.

References to "rewards" indicate special privileges or access to special privileges that result from successful verification of user input.

References to "photo" indicate a digital visual representation of a vehicle's passenger area.

References to "GPS" indicate reference to the Global Positioning System (GPS) space-based radio-navigation satellite array and associated technologies.

References to "riders" or "multiple riders" in a vehicle refers to 2, 3, or more riders depending upon the capacity of the vehicle.

Referenced to "Probability of Distinction" refers to the estimated likelihood that a candidate individual's biometric pattern does not match the biometric pattern of a base individual.

Urban and suburban dwellers often seek shared transportation options for reasons as diverse as economy in travel expenses, shared responsibility in vehicle operation, and human companionship during a commute. In metropolitan areas where traffic congestion is rife, local authorities often incentivize shared transportation options in order to relieve traffic congestion and reduce expensive road maintenance. Setting aside special travel lanes for multi-occupant "carpooling" vehicles is one such incentive that municipalities employ. Vehicles with certain established occupancies are permitted unfettered access to lesser-travelled High Occupancy Vehicle (HOV) or High Occupancy/Toll (HOT) lanes, theoretically minimizing travel delays due to traffic congestion. Such delay minimization is a coveted reward for those who choose to carpool.

Because of the desirability of designated HOV and HOT lane access, municipalities must adopt systems and procedures to track, prevent and manage abuse of such lane access. Existing systems of ensuring compliance with rules regarding High Occupancy lane access rely on self-reporting, photographic verification, or post-billing adjudication.

Drivers and riders who wish to carpool may not know of each other or may not share compatible commuting schedules. For instance, even if two commuters are aware of each other, a vehicle driven by Driver A and bound for mid-town at 6:00 am may not prove a suitable match for Rider B needing to arrive in mid-town at 6:00 pm. Consequently, a need exists for a system and method for verifying carpool compliance using software and hardware devices that permit "matchmaking" between suitable drivers and riders while confirming passenger proximity to a driver.

In an embodiment, the invention described herein is a mobile-device application that uses user interfaces and GPS software to provide a list of prospective drivers with known travel itineraries to any number of potential riders. Riders can flag drivers based upon criteria such as exactness of itinerary match and prior rider reviews of drivers. Drivers can accept or reject specific riders as matches.

In an embodiment, while transponders identify the vehicle, the RideFlag® system identifies vehicle occupancy and location. In an embodiment, the RideFlag® system confirms the presence of two or more occupants within a single vehicle when drivers and riders use the application on HOV/HOT lanes, even for free rides with no other incentive than access to the HOV/HOT lane toll free. The RideFlag® system provides the platform to collaborate with Toll Highway operators and jurisdictions managing all vehicle road access, including, in non-limiting examples, access to non-highway tolls, bridges, and any other road or traffic situation in which the validation and confirmation of vehicle occupancy is important or required.

In an exemplary embodiment, riders and drivers may use the RideFlag® application to establish carpools on an as-needed basis with no carpool registration required. The RideFlag® system is totally dynamic in that carpools are created and identified at the singular transaction level. In a non-limiting example, a carpool can exist for a single instance of a paired ride, as well as for other groups of riders and lengths of rides. The identification of the carpool is automatically known by the RideFlag® system. In this exemplary embodiment, the platform identifies the occupants, the route and time of access. The RideFlag® server may then issue a report of confirmation of occupancy to each of the relevant highway operators upon request, complementing any existing photo confirmation systems and providing either a primary or secondary occupancy validation for Toll and highway operators as users of the RideFlag® system.

Once drivers and riders have accepted matches, each is notified of the location of the other through use of GPS data associated with the driver's and rider's mobile devices. Once drivers and riders are physically within one vehicle, the GPS data can be analyzed to verify co-location of the driver and rider(s).

In an embodiment, this co-location verification takes place at a temporal validation point, at which time the rider receives a push notification to share the physical location of the smart device associated with the driver. The driver's GPS coordinates and/or other physical location data are known to the application (app), since the driver may keep the app open on the smart device for the duration of a trip. Additional physical location data may take the form of communications from smart device to smart device (such as a smart phone) through the use of one or more Nearby communication protocols, where such protocols may include, but are not limited to, Bluetooth, BLE, Zigby, or any other near field communication protocol.

A first server compares the GPS and/or other physical location data from all devices that are within a pre-set physical location of the smart device associated with the driver, and if resulting comparison provides evidence of the co-location of devices, the co-location is considered to be verified. Confirmation of such verified co-location can then be submitted to appropriate regulatory bodies for the doling of a reward, such as permitted HOV or HOT access, or permitted preferred parking, or other rewards that may be provided by the transportation authority or additional entities partnering with the transportation authority. The system in in its entirety is referred to as the RideFlag® application.

In an embodiment, the invention described herein is a method of verifying commuter vehicle occupancy by establishing communication between a server and one or more mobile devices, determining the physical locations of each of said mobile devices, verifying said mobile devices are co-located, determining whether said proximity conforms to one or more pre-determined values, delivering communications from the server to a secondary server (like one operated by or on behalf of a regulatory body), and delivering communications from the server to said mobile devices. Verification of vehicle occupancy may be affected through analysis of one or more photographic representations of the vehicle passenger compartment and/or photographic images of each individual within the passenger compartment of a vehicle.

In an alternate embodiment of the invention, a system of verifying commuter vehicle occupancy is described. The system may include a user interface, a server having a processor in wireless communication with one or more mobile devices, and a software module operative to determine the physical locations of the mobile devices. In use, the server verifies co-location of the mobile devices, delivers communications from the server to a secondary server (like one operated by or on behalf of a regulatory body), and delivers communications from the server to a user interface display on any one of the mobile devices.

The system and method described herein identifies vehicle occupancy and location as a natural product of the RideFlag® transportation application. The application confirms the presence of two or more occupants when drivers and riders simply use the app to match prospective drivers with prospective riders. When used with respect to HOT or HOV lane access, RideFlag® provides the platform to collaborate with jurisdictions and Toll Highway operators to confirm vehicle occupancy.

In an alternative embodiment, the RideFlag® application may permit the use of free or discounted access to HOT lanes to vehicles in which there is only one verified person based upon special considerations. Such special considerations may include, but are not limited to, premium access based upon a specified number of paid uses of the HOT lane, special discounts for particular dates or times, a reward offered by the operator of the HOT lane, or any other special consideration defined by the authority operating the HOT lane. In a non-limiting example, a vehicle with a single driver may be permitted to use the HOT lane after accumulating 10 authorized uses of the HOT lane, meeting all conditions of such use. Additionally, an authority operating a HOT lane may permit use of the HOT lane to single driver vehicles, or vehicles that do not meet all of the conditions for use of a particular HOT lane, to users with a mobile device in the vehicle that has been certified as having a special premium established by the authority operating the HOT lane even though the user of the mobile device in the vehicle may not be the driver of the vehicle.

In an embodiment, an array of biometric techniques may be used to validate the number of occupants present in a vehicle. Non-limiting examples of biometric techniques may include facial count and verification where each participant registers their individual face (face print signature) via the camera and is added to the ride. This technique may include a count of human faces "seen" in a prompted (relevant time/location stamped) photo validated by biometric human face determination and/or a count of human faces made by a system server based on system input other than an actual photograph. This collection of faces is assumed to be a continuous group as the vehicle passes through reward points. Whenever a rider leaves the carpool, which is accounted for in the Drop Rider process, a confirming photo is taken and the ride is marked as a carpool collection change where the total participants is decremented and the face is now removed from the collection.

In this embodiment, the RideFlag system ensures that the driver is not distracted by, for example, being asked to take a photo or give their phone to a passenger to take a photo while in the act of driving. The add/drop method as embodied in the verification and Drop Rider process steps provides a reliable history of the trip in which the system may confidently assume that the departing rider was with the carpool during the time up until any departure, given that the driver phone is used to manage the face collection, count, and verification. In this embodiment, the system may grant awards based on the collection of occupants. During the verification process, failure to take a confirming face signature when any occupant leaves the passenger compartment of the vehicle will consider that person as having never been in the carpool collection, affecting the rewards that may be awarded based upon occupancy verification. This non-limiting implementation is further discussed in a later section.

An additional biometric validation technique may utilize audio, where a count is made of distinct voices "heard" in response to audio prompts, the number and sources of such voices being validated by one or more biometric voice-distinction algorithms. In this non-limiting implementation, the occupancy validation may consist of audio collected for each voice that is different in pitch, tonality, or other audio parameters to identify each voice as separate and distinct from each other voice. Additional biometric techniques, such as iris scanning, used strictly for determining a distinction between participant occupants are also contemplated as implementations of biometric verification techniques. While use of biometric validation may be employed for many different reasons, it can be of singular help in the event that vehicle occupants do not carry smartphones or other suitable electronic devices. While this is often the case with young children, people of every age may elect not to continually carry smart devices, such as smart phones, at all times, and even those who do may elect to turn the smart devices off during transit.

In cases where RideFlag® determines that an extra level beyond smart device validation is required—such as when RideFlag® suspects one or more users may be mimicking an additional person by deploying multiple user profiles on additional devices without an actual human user present in the vehicle, biometric validation may be used to prevent users' "gaming" the system. Whenever biometric validation is deemed necessary, regardless of the reason, the instant innovation requires all occupants who intend to be counted in the occupancy count for verification to use the biometric method. Biometric techniques for occupancy verification provide avenues for multiple modes of occupancy verification without relying on any single technique.

In an embodiment, occupancy validation may be performed with a simple optical scan with dynamic occupancy count, a procedure typically performed at set geographical locations and/or certain times of the day, and/or upon lapse of a particular time interval in the users' trip. This method may require a front-seated passenger to take a "Selfie" shot (a photograph framed with at least the photographer in the resulting image) which shows the faces of all occupants of the vehicle, or separate shots showing each passenger in the vehicle and permitting a collection of distinct face signatures.

In an embodiment, occupancy validation may be performed via Facial Distinction. Such an embodiment would employ a Biometrics Engine to compare a Base Pattern with a Candidate Pattern, where each pattern is a template of biometric traits used to determine an individual. While a typical biometric model would output the probability that the Base Pattern and Candidate Pattern are a match, the RideFlag® model employs a biometric engine to determine the probability that the Base Pattern and Candidate Pattern are NOT a match. In this embodiment, the verification process may calculate the probability of Match between carpool formation and/or inclusion of new members through the indication that a new facial signature has been added to the passenger compartment, and at the end of each user's journey. Utilizing a wide-angle lens camera permits the camera/IR in a transponder to serve as the collector of facial signatures for all occupants in a passenger compartment, although this should not be considered limiting. Upon calculating a Probability of Distinction above an acceptable threshold, the RideFlag® server may determine that vehicle occupancy is sufficient to reward the vehicle occupants with lane access or any other reward that is offered by the Toll Highway or other road operator.

The RideFlag® server can dynamically perform the straightforward task of identifying the count of human faces among those participants who are facing towards the camera, with or without actually transmitting a captured photo. In an embodiment, the system actively counts faces within a single facial image or from a group of images. The system collects image data as the camera focuses, prior to taking a photograph, and compares a frame with a subsequent frame to determine if the human head, or heads, framed in the image are moving relative to one another over time. To provide alternative assurance that captured images are of faces of real individuals within the passenger compartment, the system may ask a user to smile, frown, or blink to confirm that they are real and actively located within proximity to the driver. This technique provides an accurate assessment of individuals located within a passenger compartment without physically transmitting a captured photo. The system server can measure a variety of metrics associated with the motion of each human head, and the facial signature associated with each human head either separately or together, to distinguish one human head from another, as each head is framed by the camera lens. The collected movement data is analyzed to show that the image frames individuals actively seated within the passenger compartment of a vehicle and not just images of individuals held up by other passengers or later pasted into the image data. This technique can be employed to prevent users from "fooling the system" by displaying a photograph in lieu of a live human face.

In alternate embodiments, occupancy validation may be performed using biometric data accumulated through other identifying scans in addition to one or more images stored and used for pre/post carpool validation, including but not limited to iris scanning, ear scanning, or hand and/or fingerprint scanning. In an embodiment, individually assigned facial signatures may also be used to trigger other application functionality, such as, in a non-limiting example, signing in to the passenger compartment of a particular vehicle. Alternatively, or in combination with the foregoing methods, occupancy validation may be performed through Voice Distinction, as previously described, whereby the idiosyncrasies of an individual occupant's voice, as transmitted to and determined by the RideFlag® server, serve as that occupant's unique identifier.

In an embodiment, each of the foregoing models for occupancy validation may be delivered within the RideFlag® application (app) utilizing the camera and microphone on the user's smartphone or other smart device. Alternatively, each model may be delivered as embedded software within other apps (as a software development kit for validation, and prompted by geolocation for rewards offered through the RideFlag® Rewards platform). Each model may be built into highway transponders with automatic verification of occupants, such a system utilizing a camera equipped with a wide-angle lens and dedicated chip for reporting human face count and the fact that the human face count is for distinct human faces that make up the total face count, utilizing an Infra-Red camera to evaluate distinct human heat signature in the confines of the vehicle, or utilizing a combination of an optical camera and an Infra-Red camera, when each of these cameras is either outside or inside the vehicle.

In an embodiment, validation for rider occupancy may also be performed through the use of facial signatures captured within a smart device associated with a driver. In this embodiment, the capture and use of facial signatures may be performed in combination with all biometric verification techniques herein presented. The facial signatures may be captured and stored within a smart device through the use of the camera integral to the smart device. The verification of occupancy may be performed through the count of facial signatures that are established as being located within a preset distance of the driver during a journey, where the preset distance is the same as the physical area of a vehicle associated with the driver, indicating that the individual facial signatures are collocated with the driver within that vehicle. The verification of occupancy may also be performed through a simpler count of faces and/or heads where no stored facial signature may be required to perform this count and provide an occupancy verification based thereupon.

To initiate this process, the driver registers his facial signature on his smart device by utilizing the view finder of the camera integral to the phone. The view finder captures a mathematical description of the face of the driver, whether or not a photo is captured. This mathematical description is the facial signature for the driver that is stored in the smart device for later comparison and verification. The driver may then capture additional facial signatures for all other participants in a carpool or other individuals who may be located within the preset distance of a driver in a current journey or in future journeys. Once registered on a driver, or other user's, smart device, the registration process does not have to be repeated as the smart device may contain a "friends list" into which the facial signature is stored.

When a carpool action takes place utilizing the face count verification of occupancy, each participant in the carpool is accepted into that instance of a carpool by looking at the smart device associated with the driver or another user through a "check in" action. Looking at the smart device permits the smart device to capture the facial signature of the individual. The facial signature is then compared against the facial signatures in the "friends list" currently stored in the smart device. If the facial signature is recognized, the individual is added to that particular carpool journey. If the facial signature is not recognized, the driver or other user will be prompted to register the individual and place the newly captured facial signature into the "friends list" maintained on the smart device and add the individual to the instant carpool journey.

When a registered individual leaves the particular carpool journey prior to reaching the driver's final destination, the individual may be removed from the carpool journey at the point they leave the vehicle and are no longer within the preset physical distance from the smart device associated with the driver or other user through a "check out" action. As the individual members of the particular carpool journey leave the vehicle, either at the driver's destination or prior, the smart device maintains a record of the time and location of the departure of each facial signature, representing the individuals participating in the particular carpool journey, to create and manage the history of the carpool journey and the participants therein.

The driver, or other preselected user if the driver is not the manager of the particular carpool journey, may be responsible for all "check in" and "check out" actions for the duration of the carpool journey. The driver, or other user, may be motivated to comply with the "check in" and "check out" actions for the particular carpool journey because the rewards earned along the carpool journey will not be granted until the driver or other user has confirmed the occupancy of the vehicle by having each participant both "check in" and "check out" of the carpool journey. In this embodiment, all rewards will be held in suspension until occupancy is confirmed at the end of the carpool journey, regardless of when each individual "taps out" of the vehicle.

In a non-limiting example, the process of building the occupancy of the vehicle does not require that every participant in the carpool journey be present in the view frame at the same time. In this example, each face can be viewed and confirmed individually at the start of the trip, by "tapping in" while the vehicle is stopped. In a further non-limiting example, a Mom may scan the faces of each of her children prior to beginning the carpool journey and then scan the faces of her children when the vehicle has reached the journey termination point. This process may be used in combination with other occupancy verification methods to provide a secondary check of the vehicle occupancy.

When an optical solution is used in combination with an Infra-Red solution, such a model would include a low-resolution optical camera, an infrared scanner, and a chip with known human face shape recognition for counting faces, as well as an Infra-Red interpreter for estimating human body heat signatures. When two metrics are combined (heat signature and optic face count), a more accurate probabilistic count of human occupants may be determined. In implementing such a solution, the optic and heat signature measurements remain anonymous and non-disseminated. No imagery is necessarily captured, stored or transmitted beyond the parameters of its immediate use.

In an embodiment, the instant innovation is a system and method of verifying vehicle occupancy by capturing one or more electronic images of the occupants of a vehicle, using a device capable of capturing one or more photo frames, employing optical spatial differentiation upon the one or more electronic images and in so doing performing a first individual uniqueness determination upon said occupants of said vehicle. This first individual uniqueness determination is performed as a boxed headcount of the one or more photo frames. In such boxed headcount, the instant innovation employs an algorithm to identify images in the photo frames that correspond to indicia indicating that the image is of a human face. Once the algorithm has determined the presence of indicia indicating that the image is of a human face, the algorithm tracks the facial image across subsequent images by placing a two-dimensional box around the image.

The instant innovation employs biometric identification such as, by way of non-limiting example, facial recognition, iris or pupil recognition, finger vein or palm vein pattern recognition, fingerprint recognition, ear recognition and/or voice recognition to perform a second individual uniqueness determination upon the occupants of the vehicle. Appropriate biometric identifications capture landmarks in a 512 model. All biometric identifications are used by the instant innovation to confirm the presence of the same occupant at the end of the trip as at the start of the trip in the vehicle.

In the embodiment in which there is a concern that the occupants of a vehicle are presenting non-genuine facial images for analysis, the instant innovation can perform a realness confirmation of an image of a person in a photo frame. The instant innovation employs an algorithmic analysis upon the one or more electronic images, to determine the genuineness of the images based as least in part on detection of common image manipulation indicia (such as, by way of non-limiting example, photo stretching) and/or indicia of non-natural light detection (such as, by way of non-limiting example, device screen glare). In an embodiment, the instant innovation may use topographic imaging performed by devices with dual lenses on a camera. The instant innovation may perform one or more calculations to determine the absence or non-absence of facial movement (such as that which leads to human expression change) to aid a realness determination. In an embodiment, this realness determination becomes the third individual uniqueness determination upon the occupants of the vehicle. The instant innovation calculates actual vehicle occupancy at any given time as a function of the first individual uniqueness determination, the second individual uniqueness determination, and the third individual uniqueness determination, and communicates the actual vehicle occupancy to one or more data servers. These data servers may in turn communicate with other data servers and one or more smart devices. In an embodiment, the one or more data servers may be operated by a road management entity and/or vehicle regulatory body such as a department of motor vehicles, department of transportation, or other identified authority. The one or more smart devices may include any device equipped with a processor and radio frequency (RF) transmitter module.

Turning now to FIG. 1, a system diagram for an exemplary system operation consistent with certain embodiments of the present invention is shown. During matchmaking 100, driver's device 102 and rider's device 104 are paired based upon data provided by the users of the devices, such as destination, desired times of departure and arrival, and fee amounts. Once paired 105, driver's device 102 and rider's device 104 enter commence travel phase 106. Commence Travel phase 106 includes driver and rider meeting in physical space and beginning travel to a mutually-agreed upon destination. Upon reaching discrete validation points 108, driver's device 102 and rider's device 104 are triggered by a first server 109 to provide first server 109 with GPS coordinates and/or physical location based upon Nearby location as presented through near field communication between smart devices to determine whether devices are co-located. If the devices associated with the driver and one or more riders are determined to be co-located at 108 and if first server 109 determines that reward requirements are met, first server 109 confirms reward status with second server (owned or controlled by the reward grantor, such as a regulatory agency, transportation authority, or a partner to these entities) and with at least driver's device 102. Upon confirmation of the reward status, rewards may be transmitted to a driver 110.

Figure 2:
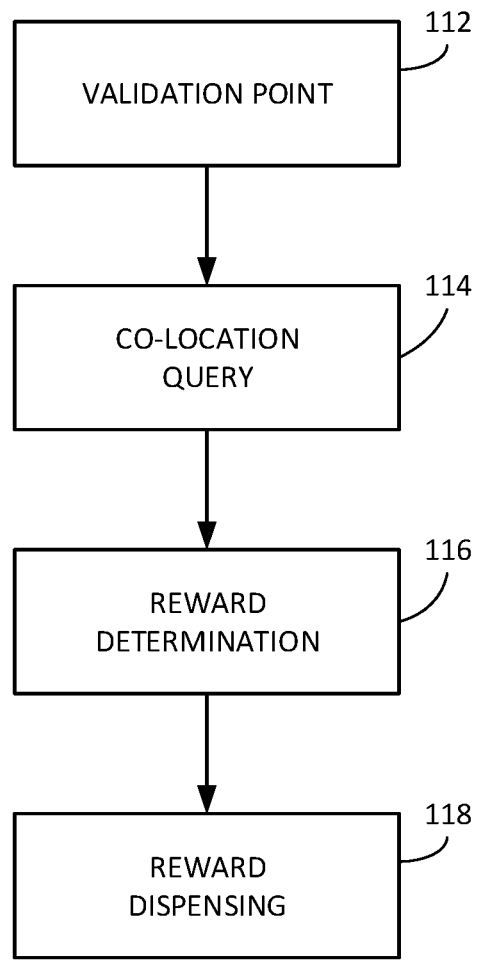
FIG. 2 is a process flow diagram for the determination of sufficiency of award criteria using mobile device GPS data and communication of same by server operation consistent with certain embodiments of the present invention.

Turning now to FIG. 2, a process flow for the determination of award criteria consistent with certain embodiments of the present invention is shown. In an embodiment, a rider verifies his GPS coordinates and/or physical location based upon Nearby location as presented through near field communication between smart devices to determine whether devices are co-located at a validation point 112. At 114, the system server compares the physical location confirmation information sent from a driver to that driver's known physical location as determined by the RideFlag® system. From this information, the server may determine if the driver and rider(s) are currently co-located. At 116, the server determines if the necessary reward criteria have been met. Most commonly, reward criteria would involve the number of occupants in a car associated with a time of day. The number of occupants in a car may be determined by the number of RF signals detected at a validation point, or by photo evidence provided by any one of the detected mobile devices associated with an RF signal that is collocated with the driver's mobile device. At 118, the server sends determination regarding satisfaction of reward criteria to the appropriate regulatory authority, transportation authority or partner, the rider(s), and the driver.

Figure 3:
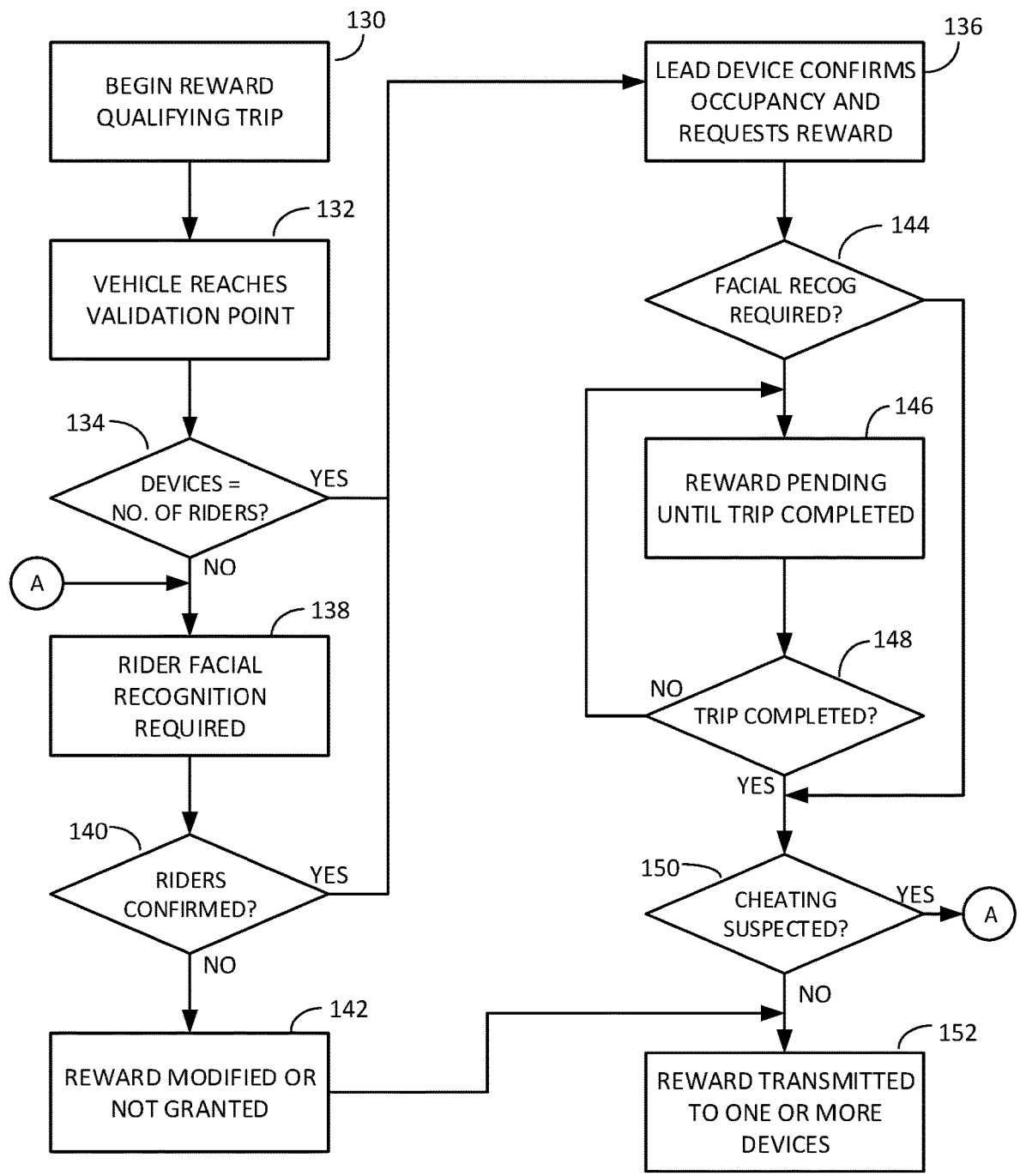
FIG. 3 is a process flow diagram for verification of vehicle occupancy consistent with certain embodiments of the present invention.

Turning now to FIG. 3, a process flow diagram for verification of vehicle occupancy is shown. In an embodiment, at 130, the ride commences, with the driver and rider beginning the trip to any reward point or rider destination. At 132, the driver's device comes within detection distance of a validation point which may then trigger a server request for verification of the number of car occupants. In an embodiment, at 134 the lead smart device, such as, in a non-limiting example, the smart device associated with the driver of the vehicle, reports the number of smart devices registered to be within the passenger compartment of the vehicle and still confirmed to be physically co-located within the passenger compartment with the lead smart device. The system server may then utilize the report from the lead smart device as a confirmation of occupancy in the vehicle for all registered passengers and pushes the request for an award to the rewarding server at 136. In a non-limiting example, such a validation point would typically be positioned immediately prior to HOV or HOT lane access. In the case where the reward is a preferred parking spot instead of special lane access, the validation point may be positioned at a parking lot entrance or parking garage entrance.

In an embodiment, at 138, in cases where the number of RF transmitter-equipped devices (i.e.: smart devices such as smartphones, or other RF transmitting devices) does not equal the number of individuals collocated in a vehicle, which includes the driver and all riders, the server sends a request to the lead smart device for additional verification of occupancy in the passenger compartment of the vehicle. In a non-limiting implementation, the additional verification may take the form of capturing facial signatures for all occupants by the lead smart device capturing a photograph of all occupants. A facial signature is calculated for all occupants in the photograph and compared against all facial signatures for occupants registered for the trip. At 140, if the comparison indicates a confirmation of all individuals registered for the trip are occupants of the passenger compartment of the vehicle, the RideFlag® server may then hold the push for reward determination until the destination for the vehicle has been reached.

If, however, the number of occupants is not verified by the comparison as having the proper number and identified facial signatures, at 142 the system may determine that the reward may require modification or that no reward should be granted.

Once again, at 136, if the number of smart devices reported is equal to the number of occupants registered for the trip, and all respondents are determined to be within a set distance that indicates they are close enough to the driver that they are within the passenger compartment of the driver's vehicle, the RideFlag® system may still at 144 request a face count for all occupants of the vehicle to comply with any external requirements for award eligibility and grant. If a facial count is not required or requested of the lead smart device from the RideFlag® server, the RideFlag® server may still perform a test at 150, on an as-needed or random basis, to determine if "cheating" is occurring. "Cheating" for the RideFlag® system is defined as rewards that are obtained contrary to proximity requirements or are obtained through false reporting of occupancy of a vehicle in combination with additional smart devices that may be located within the passenger compartment of the vehicle, but are not associated with separate individuals. If a determine is made that cheating is not occurring, at 152 the RideFlag® server may transmit any and all rewards and incentives that are due to the lead smart device for the given trip and occupancy level.

In an embodiment, at 144, in cases where the RideFlag® server has requested a facial count, the lead smart device may be instructed to send a photo of vehicle occupants time-stamped with the time of the driver's device that triggered the verification request at the encountered validation point. Uploading the time-stamped photo to the server permits the photo verification of the number of occupants in a vehicle utilizing the face count methodology. If the lead smart device reports occupancy via the Face count method, the RideFlag® server will flag any rewards and/or incentives as "pending" until the particular trip completes and all individuals as specified by facial signature for each individual face were accounted for at each point at which an individual departed from the trip and from the occupancy of the vehicle at 148. Failure to indicate a departure by decrementing the count of facial signatures within the passenger compartment of the vehicle upon the exit of any individual will provide the assumption in the RideFlag® server processing that the counted individual was not in the passenger compartment of the vehicle for that particular trip. If any individual has been determined to not be within the passenger compartment of the vehicle for any particular trip, any rewards that could have potentially been earned by the lead smart device or other smart devices in the vehicle will be re-evaluated by the RideFlag® server based upon confirmed occupants at the point of the reward.

As an additional verification, if at the termination point of any trip the RideFlag® server or reward grantor at 150 determines or suspects that the driver and/or riders may have falsified the proximity requirements the server may label this action as "cheating" the system. In a non-limiting example, one condition the server may label as "cheating" may be using multiple phones not associated to physical individuals to attempt to establish that there are an equal number of RF-transmitting devices and individuals collocated within a single vehicle. If the server determines that an action or activity that may be labeled as "Cheating" has occurred, the server may require the performance of a photographic check consisting of facial signature verification and/or facial count verification, which serves as a dual validation of the occupancy of the passenger compartment of a vehicle and check on any suspected cheating activity through post-event reply requests from the RideFlag® server to one or more smart devices co-located within a passenger compartment of a vehicle.

At 152, if the reward grantor is satisfied that that the occupancy of the vehicle has been properly verified, and that the driver is not "cheating" in some fashion, the reward grantor may then transmit the reward certificate, notification, validation, or permission to the driver of the vehicle.

Figure 4:
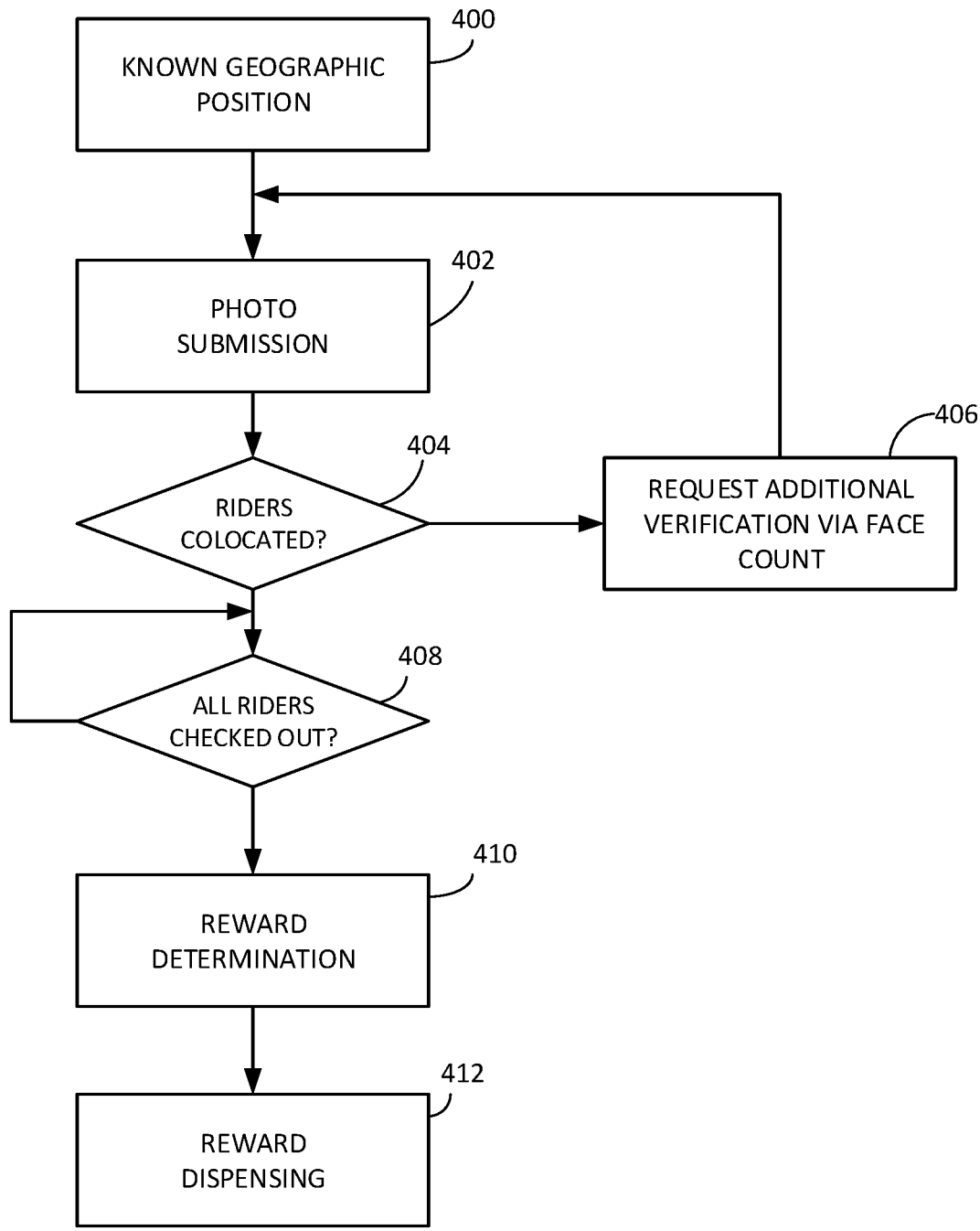
FIG. 4 is a process flow diagram for the determination of sufficiency of award criteria using one or more mobile device digital images and communication of the same by server operation consistent with certain embodiments of the present invention.

Turning now to FIG. 4, a process flow for an alternate determination of award criteria consistent with certain embodiments of the present invention is shown. In an embodiment, a smart device having a processor and an RF transmitter and associated with a driver communicates its physical location to an application server at 400. At 402, a driver of a vehicle records a verification photo of all vehicle occupants that are included in the occupancy of a vehicle passenger compartment for a particular trip. The verification photos are utilized by the RideFlag® server to create a facial signature for each occupant. Photograph capture and facial signature creation may occur at times different from the start of any particular occupancy or carpool trip, with the RideFlag® server active to associate facial signatures with occupants that have been previously captured by the smart device associated with the driver. Thus, at the beginning of a trip individuals may be included in the occupancy of the passenger compartment based upon facial signatures previously captured or newly captured by the smart device associated with the driver prior to any occupancy or trip. Additionally, the RideFlag® server may compare facial signatures for individuals regardless of facial orientation or expression to verify individuals who are involved with a particular trip or occupancy.

At 404, the RideFlag® server determines the number of occupants that are present in the vehicle based upon the count of the number of facial signatures that are in the captured photograph. At 406, if there are individuals for which the RideFlag® server does not have a facial signature either previously captured or newly captured the RideFlag® server may request additional photographs to complete the facial signature head count for any individuals that are in the occupancy of a particular trip but for whom the RideFlag® server does not have a facial signature stored in the verification database managed by the RideFlag® server.

At 408, smart device associated with the driver confirms the current occupancy status for each individual that is included in the occupancy of the passenger compartment. The driver's smart device performs a decrement of the occupants of the passenger compartment utilizing a Face Count procedure each time an occupant leaves the vehicle through a "check out" for each occupant that leaves the vehicle during the trip. The RideFlag® server holds any trip reward determination in abeyance until all occupants have been determined to have "tapped out" of the passenger compartment of the vehicle at the termination of the trip.

At 410, the RideFlag® server determines if the number of occupants meets one or more reward criteria. Additionally, the RideFlag® server is active to determine if external award criteria are required for a particular trip and if those external award criteria may include, such as, in non-limiting examples, whether the vehicle is properly registered, if the driver is part of a privileged group, if reward granting organizations are providing one or more limited time additional awards, or any other special criteria that may affect the award to be earned and captured. At 412, the RideFlag® server may send a determination regarding satisfaction of reward criteria to the appropriate regulatory authority, transportation authority or other authorized entity, the rider, and the driver, with the caveat that the award may be "whitelisted", or held in abeyance, until confirmation has been completed. Confirmation of award is sent to both any award sponsor authority and to the smart device associated with a driver at the end of any qualifying trip in which all occupants for the journey have been accounted for utilizing the Face Count process. The regulatory authority, transportation authority, or other authorized entity may then issue a certificate or any other verification acknowledgement instituted for use by the issuing authority that the reward will be provided to a person associated with the vehicle, where the person associated with the vehicle may include a driver, a rider, or other authorized person such as, in a non-limited example, the owner of the vehicle.

Figure 5:
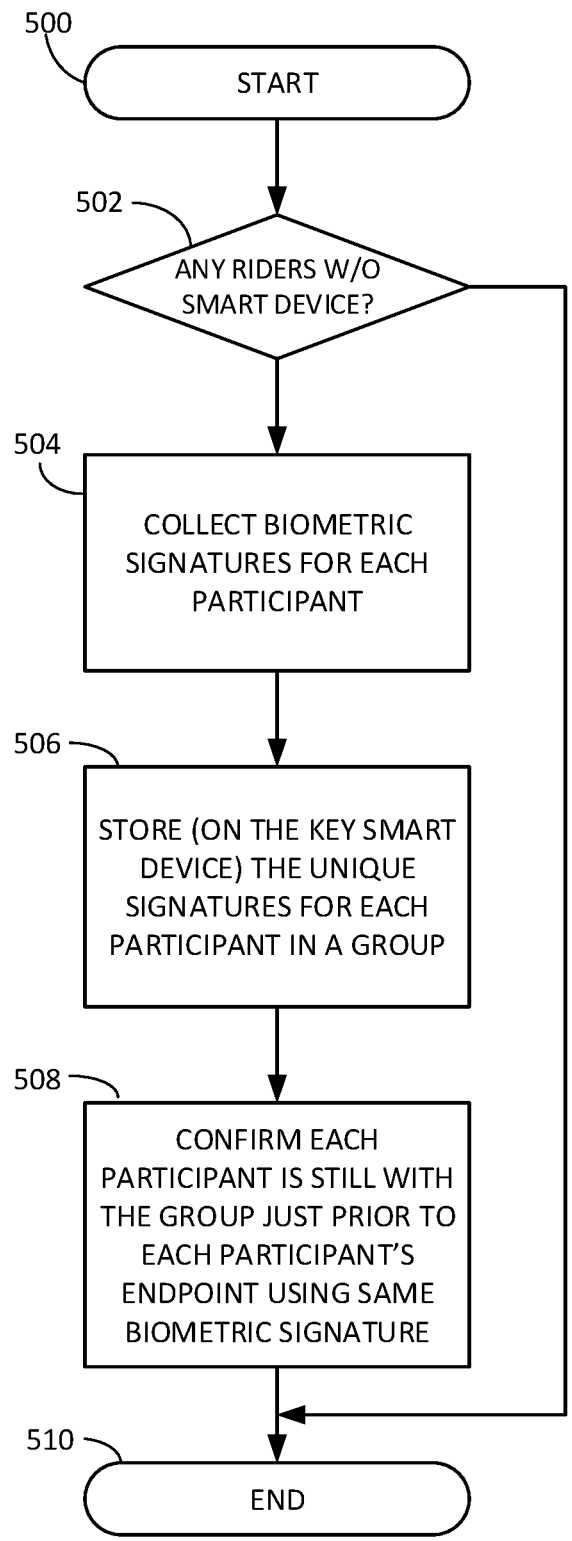
FIG. 5 is a process flow diagram for returning a Probability of Distinction consistent with certain embodiments of the present invention.

Turning now to FIG. 5, a process flow diagram for accounting for occupants of a vehicle who do not have a smart device associated with the occupant during a qualifying journey consistent with certain embodiments of the present invention is shown. At 500, the process begins. At 502, a Determination is made as to whether occupants of a passenger compartment of a vehicle in which a smart device is associated with a driver, but one or more occupants do not have an associated smart device. In a non-limiting example, at 502 the Determination is made based upon the query: are there any riders present in the vehicle who do not possess smart phones or smart devices. If "no," then the process ends at 510. If "yes," then at 504 the system collects for each individual that does not have a smart device associated with the individual, data suitable for biometric analysis, including but not limited to audio, optical, and Infra-Red (IR) data. At 506 the data is processed for biometric markers, such biometric markers capable of forming a discernable pattern. In an embodiment, unique signatures formed from the processed biometric markers may be stored on the lead smart device for each individual in the group. As a validation capability the RideFlag® server determines and returns the Probability of Distinction, a number or series of numbers representing the likelihood that a pattern resulting from biometric signature data collected from one individual candidate, like a passenger, does not match that of a base pattern from a known individual, such as a driver. This Probability of Distinction presents a separable identification for each member of the group that is participating in a particular trip. At 508, the lead smart device may confirm that each member of the group participating in the trip is still within the group just prior to each member's pre-determined endpoint utilizing the unique signature, composed of the previously described biometric markers, previously determined for each individual member of the group. At 510 the process ends.

Figure 6:
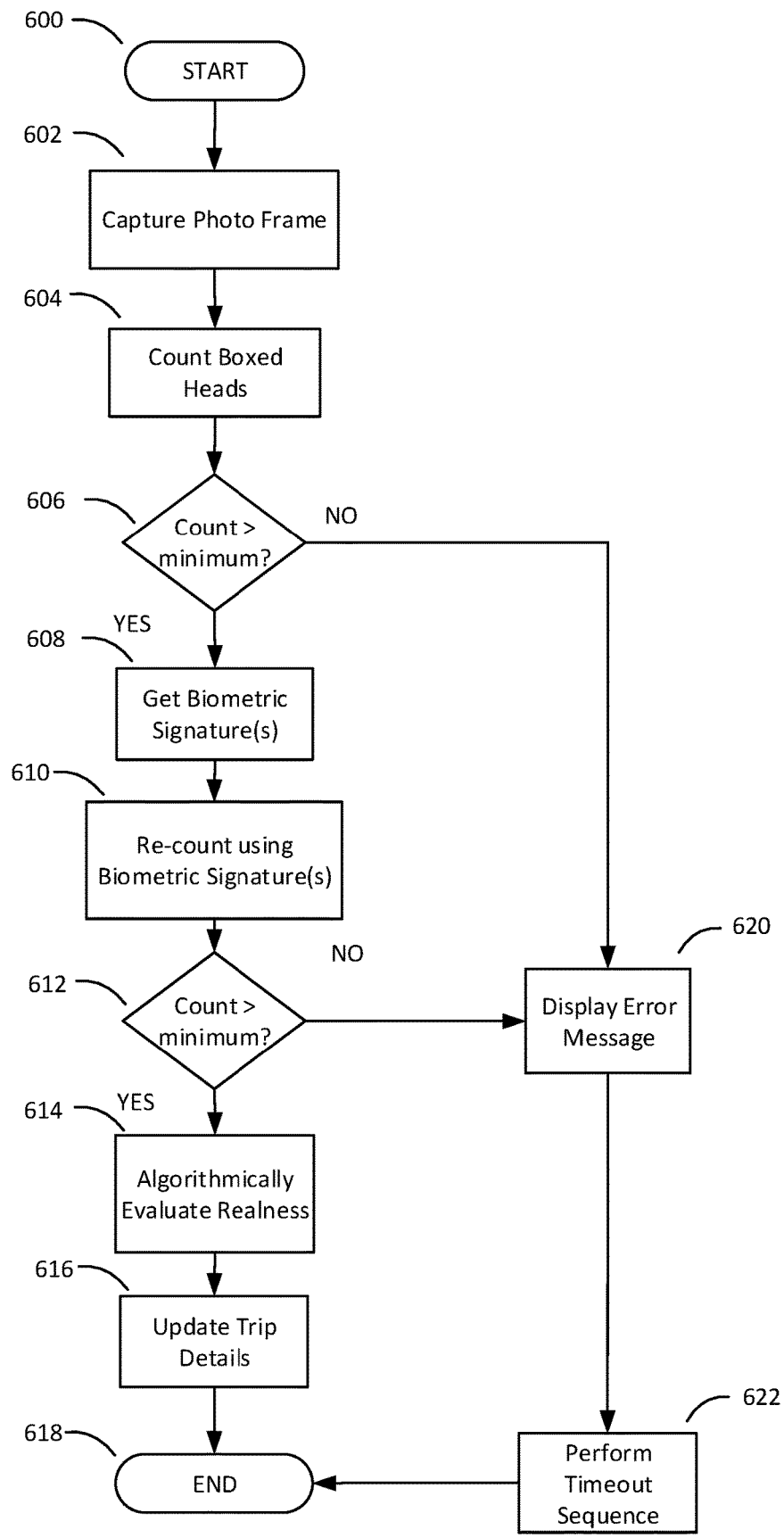
FIG. 6 is a process flow diagram for determining the realness of one or more counted riders in a vehicle consistent with certain embodiments of the present invention.

Turning now to FIG. 6, a process flow diagram for determining the realness of one or more counted riders in a vehicle consistent with certain embodiments of the present invention is shown. At 600 the process starts. At 602 the system of the instant innovation captures one or more images of the occupants of a vehicle. In an embodiment, this capture is performed by a camera integrated into one or more smart device. At 604, the system of the instant innovation performs a boxed head count of individual occupants of the vehicle that the system initially determines to be discrete human individuals. At 606 the system of the instant innovation determines whether the boxed head count reveals the presence of a sufficient number of discrete human individuals to qualify the occupants of the vehicle for specific rewards and/or incentives. If at 606 the boxed head count is determined to be greater than the minimum count required, then at 608 the system obtains biometric signatures to correspond with the individual vehicle occupants initially determined to be discrete human individuals. At 610 the system of the instant innovation performs a re-count of vehicle occupants using the biometric signature or signatures thought to indicate the presence of one or more individual humans. If at 612 the re-count produces a count that is greater than the minimum required, then at 614 the system of the instant innovation uses an algorithm to evaluate the realness of the captured image of each individual human occupant. This realness is a measure of the certainty with which the genuineness of the captured image can be algorithmically determined. By way of non-limiting example, a genuine image would be an image of a real, live human being existing at the point in time and space which the image purports to capture. By way of non-limiting example, such realness evaluation may be performed by automated human movement detection, automated image distortion detection, and/or automated light anomaly detection. At 616 the system of the present innovation updates the vehicle trip details resident upon one or more server and/or upon one or more smart device. If at 606 or at 612 either count is not greater than the required minimum, then at 620 the system displays one or more error messages and at 622 the system performs a time out sequence. At 618 the process ends.

Figure 7:
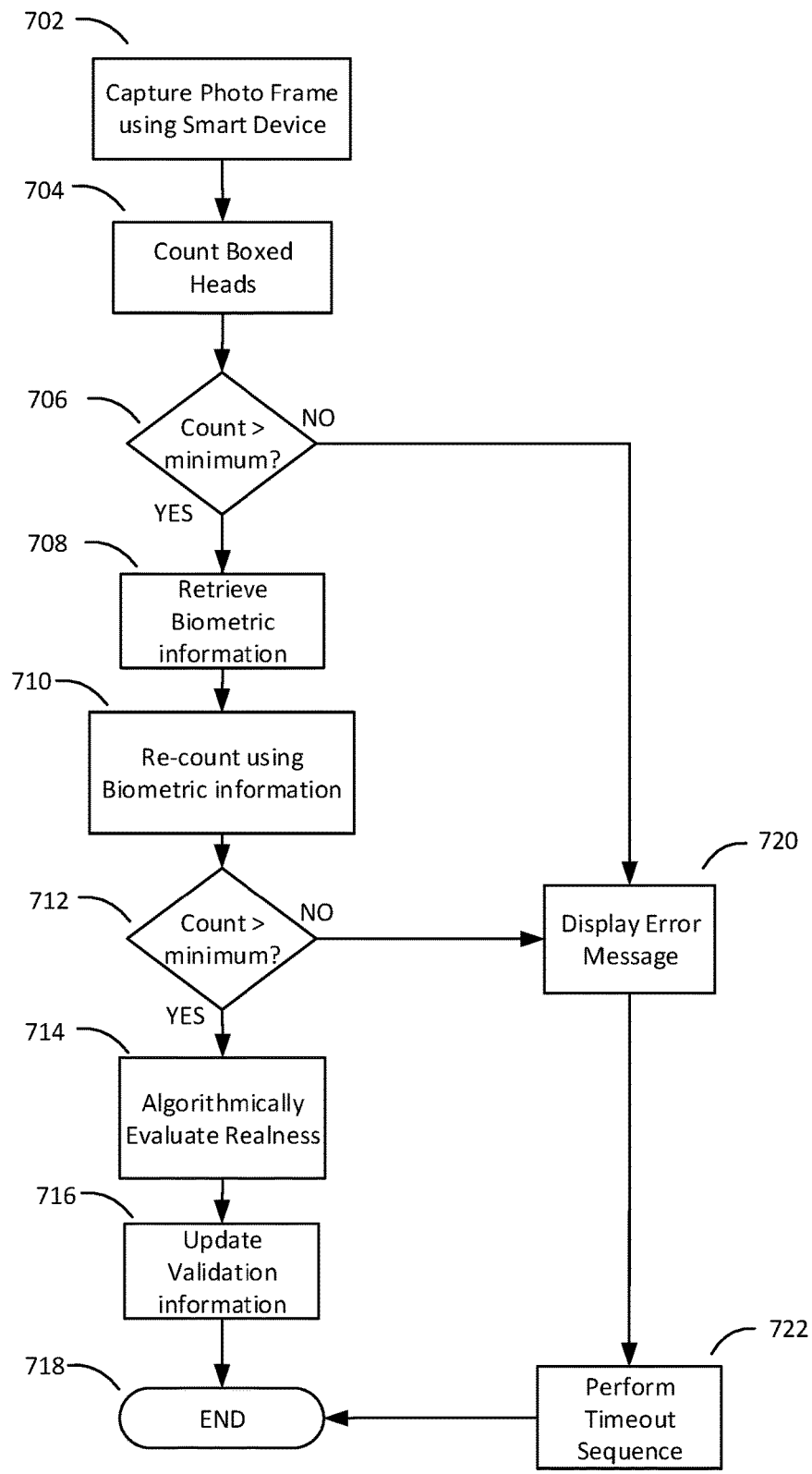
FIG. 7 is a process flow diagram for determining the method of validation to update validated count of persons within a vehicle consistent with certain embodiments of the present invention.

Turning now to FIG. 7, a process flow diagram for determining the method of validation to update validated count of persons within a vehicle consistent with certain embodiments of the present invention is shown. At 702 a rider, typically, but not always, the driver, utilizes a smart phone or other smart device equipped with one or more cameras to capture a photo frame of the occupants of a vehicle. At 704 a strait forward method of counting the number of heads within the captured photo frame that have identification boxes surrounding each head in the captured photo frame may be employed to establish a raw count of the occupants in the captured photo frame. At 706 the smart phone or other smart device, when equipped with the Rideflag application module, may establish the count and determine if the number of boxed heads meets the minimum number for validation of ridership for various purposes, including, but not limited to, rewards that may be available for certain occupancy levels. Alternatively, the smart phone of other smart device may transmit the captured photo frame to a Rideflag server to perform the boxed heads count and evaluation and return a result to the smart phone or smart device. If the count does not meet the minimum level established or the count could not be determined from the captured photo frame, an error code may be transmitted to the smart phone or other smart device at 720. The system may then perform a timeout sequence at 722 to determine if another photo is captured.

If the minimum count at 706 is validated, the smart device or the system server may retrieve biometric information about riders to perform a second method of validation in addition to a boxed head count. The biometric validation step at 710 may be used to perform a second count of the number of riders captured within the photo frame. This second count may be used as verification of the boxed head count to establish greater confidence in the boxed head count, or it may be used instead of the boxed head count as the validation metric for the vehicle. Once again, either the smart device or the Rideflag system server may perform a comparison to determine if the number of occupants in the vehicle meets the minimum number of occupants for various purposes, including minimum number of riders for a lane, reward considerations, and/or payment purposes, at 712. If the count does not meet the minimum level established or the count could not be determined from the biometric information associated with the captured photo frame, an error code may be transmitted to the smart phone or other smart device at 720. The system may then perform a timeout sequence at 722 to determine if another photo is captured.

At 714, the smart device or the Rideflag system server may utilize a software application such as, but not limited to, Real Face to algorithmically evaluate the realness of each of the images captured in the photo frame. Real Face, or another photo evaluation software module, may be used to validate that the individuals captured in the photo frame are indeed real human beings and not cardboard images, other photos, dummies, or other simulations used in lieu of real, valid riders. Once realness of the individuals in the captured photo frame has been verified, the rider validation information is updated in the smart device at 716. At the end of a trip, or at other required validation or audit points, the smart device may upload the validation information to the Rideflag server to validate ridership to qualify for ridership level, rewards available, payment purposes, or any other purpose established by the roadway authorities. Alternatively, the smart device may upload the photo frame information to the Rideflag server and all validation and realness evaluation may be performed within the Rideflag server to validate ridership and qualify for ridership level, rewards available, payment purposes, or any other purpose established by the roadway authorities. Once ridership is validated or the validation process has timed out, the process ends at 718.

While certain illustrative embodiments have been described, it is evident that many alternatives, modifications, permutations and variations will become apparent to those skilled in the art in light of the foregoing description.

We claim:

1. A method of verifying vehicle occupancy, the method comprising:
    capturing one or more electronic images of occupants of a vehicle;
    employing optical spatial differentiation upon said one or more electronic images to perform a first individual uniqueness determination upon said occupants of said vehicle;
    employing biometric identification upon said occupants of said vehicle to perform a second individual uniqueness determination upon said occupants of said vehicle;
    employing an algorithmic analysis upon said one or more electronic images to perform a third individual uniqueness determination upon said occupants of said vehicle, wherein said algorithmic analysis determines a probability of a genuineness of said one or more electronic images being of one or more live human beings;
    calculating actual vehicle occupancy as a function of said first individual uniqueness determination, said second individual uniqueness determination, and said third individual uniqueness determination;
    using a first data server to send communications from the first data server to a second data server; and
    using one or more smart device to receive communications from the first data server and/or the second data server.

2. The method of claim 1, wherein said capturing of one or more electronic images comprises capturing of one or more photo frames.

3. The method of claim 2, wherein said optical spatial differentiation comprises performing a boxed headcount of said one or more photo frames.

4. The method of claim 1, wherein said biometric identification utilizes any of facial recognition, iris or pupil recognition, finger vein or palm vein pattern recognition, fingerprint recognition, ear recognition and/or voice recognition.

5. The method of claim 1, wherein said genuineness of said one or more electronic images is at least in part a function of the absence or non-absence of image distortion and/or non-natural light detection.

6. The method of claim 1, wherein communication to said second data server serves as communication with a road management entity and/or vehicle regulatory body.

7. The method of claim 1, wherein the one or more smart devices include a device equipped with a processor and a radio frequency (RF) transmitter module.

8. The method of claim 1, wherein the capturing, the employing optical spatial differentiation, the employing biometric identification, the employing the algorithmic analysis, and the calculating are performed at a start of a trip to calculate the actual vehicle occupancy at the start of the trip, and the method further comprises performing the capturing, the employing optical spatial differentiation, the employing biometric identification, the employing the algorithmic analysis, and the calculating again at an end of the trip to calculate an actual vehicle occupancy at the end of the trip.

9. The method of claim 1, further comprising confirming the same occupants at the start and end of the trip.

10. The method of claim 1, further comprising repeating the capturing, the employing optical spatial differentiation, the employing biometric identification, the employing the algorithmic analysis, and the calculating at one or more validation points.

11. A system of verifying vehicle occupancy, the system comprising:
a first data server in communication with a second data server; and
one or more smart devices in communication with said first data server and/or said second data server and configured to capture one or more electronic images of occupants of a vehicle;
wherein the system is configured to:
employ optical spatial differentiation upon said one or more electronic images to perform a first individual uniqueness determination upon said occupants of said vehicle;
employ biometric identification upon said occupants of said vehicle to perform a second individual uniqueness determination upon said occupants of said vehicle;
employ an algorithmic analysis upon said one or more electronic images to perform a third individual uniqueness determination upon said occupants of said vehicle, wherein said algorithmic analysis determines a probability of a genuineness of said one or more electronic images being of one or more live human beings;
calculate actual vehicle occupancy as a function of said first individual uniqueness determination, said second individual uniqueness determination, and said third individual uniqueness determination;
use said first data server to send communications from said first data server to said second data server; and
use said one or more smart devices to receive communications from said first data server and/or said second data server.

12. The system of claim 11, wherein said capturing of one or more electronic images comprises capturing one or more photo frames.

13. The system of claim 12, wherein said optical spatial differentiation comprises performing a boxed headcount of said one or more photo frames.

14. The system of claim 11, wherein said biometric identification utilizes any of facial recognition, iris or pupil recognition, finger vein or palm vein pattern recognition, fingerprint recognition, ear recognition and/or voice recognition.

15. The system of claim 11, wherein said genuineness of said one or more electronic images is at least in part a function of the absence or non-absence of image distortion and/or non-natural light detection.

16. The system of claim 11, wherein communication to said second data server serves as communication with a road management entity and/or vehicle regulatory body.

17. The system of claim 11, wherein the one or more smart devices include a device equipped with a processor and radio frequency (RF) transmitter module.

18. The system of claim 11, wherein the system is configured to perform the capturing, the employing optical spatial differentiation, the employing biometric identification, the employing the algorithmic analysis, and the calculating at a start of a trip to calculate the actual vehicle occupancy at the start of the trip, and the system is further configured to perform the capturing, the employing optical spatial differentiation, the employing biometric identification, the employing the algorithmic analysis, and the calculating again at an end of the trip to calculate an actual vehicle occupancy at the end of the trip.

19. The system of claim 11, wherein the system is further configured to confirm the same occupants at the start and end of the trip.

20. The system of claim 11, wherein the system is further configured to repeat the capturing, the employing optical spatial differentiation, the employing biometric identification, the employing the algorithmic analysis, and the calculating at one or more validation points.

21. A method of verifying vehicle occupancy, the method comprising:
employing optical spatial differentiation upon one or more electronic images of occupants of a vehicle to perform a first individual uniqueness determination upon said occupants of said vehicle;
employing biometric identification upon said occupants of said vehicle to perform a second individual uniqueness determination upon said occupants of said vehicle;
employing an algorithmic analysis upon said one or more electronic images to perform a third individual uniqueness determination upon said occupants of said vehicle, wherein said algorithmic analysis determines a probability of a genuineness of said one or more electronic images being of one or more live human beings;
calculating actual vehicle occupancy as a function of said first individual uniqueness determination, said second individual uniqueness determination, and said third individual uniqueness determination; and
using a first data server to communicate with one or more smart devices.

22. A system of verifying vehicle occupancy, the system comprising:

a first data server in communication with one or more smart devices, wherein the first data server is configured to:
  employ optical spatial differentiation upon one or more electronic images of occupants of a vehicle captured by the one or more smart device to perform a first individual uniqueness determination upon said occupants of said vehicle;
  employ biometric identification upon said occupants of said vehicle to perform a second individual uniqueness determination upon said occupants of said vehicle;
  employ an algorithmic analysis upon said one or more electronic images to perform a third individual uniqueness determination upon said occupants of said vehicle, wherein said algorithmic analysis determines a probability of a genuineness of said one or more electronic images being of one or more live human beings; and
  calculate actual vehicle occupancy as a function of said first individual uniqueness determination, said second individual uniqueness determination, and said third individual uniqueness determination.

\* \* \* \* \*